US012731084B2

(12) United States Patent
Pham et al.

(10) Patent No.: US 12,731,084 B2
(45) Date of Patent: Sep. 8, 2026

(54) METHOD AND SYSTEM FOR TRAINING OF ARTIFICIAL INTELLIGENCE AND MACHINE LEARNING MODELS

(71) Applicant: JPMorgan Chase Bank, N.A., New York, NY (US)

(72) Inventors: Baoquoc Pham, Richmond, TX (US); John Buford, Somerset, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 965 days.

(21) Appl. No.: 17/882,368

(22) Filed: Aug. 5, 2022

(65) Prior Publication Data

US 2024/0046161 A1 Feb. 8, 2024

(51) Int. Cl.
*G06N 20/20* (2019.01)
*G06F 18/22* (2023.01)
*G06F 18/40* (2023.01)

(52) U.S. Cl.
CPC ............. *G06N 20/20* (2019.01); *G06F 18/22* (2023.01); *G06F 18/40* (2023.01)

(58) Field of Classification Search
None
See application file for complete search history.

(56) References Cited

U.S. PATENT DOCUMENTS

2019/0303765 A1* 10/2019 Gou ...................... G06F 18/231
2020/0104737 A1* 4/2020 Abaci ..................... G06F 17/15
2021/0012236 A1* 1/2021 Carrasco ................. G06N 5/04
2021/0174246 A1* 6/2021 Triplet ................... G06N 20/20
2022/0263860 A1* 8/2022 Crabtree ............ G06F 11/3006

* cited by examiner

*Primary Examiner* — Kannan Shanmugasundaram
(74) *Attorney, Agent, or Firm* — Greenblum & Bernstein, P.L.C.

(57) ABSTRACT

A method and system for training a machine learning (ML) model are provided. The method includes receiving a first set of parameters that relate to measuring a training status of the ML model; executing a first training operation in order to generate respective values of each of the first set of parameters; analyzing a result of the first training operation based on the respective values of each of the first plurality of parameters; and determining, based on the analysis, whether the first training operation has generated an improvement in the ML model. When the first training operation is determined as not having generated an improvement in the ML model, a second set of parameters is received, and a second training operation is executed in order to generate respective values of each of the second set of parameters.

18 Claims, 9 Drawing Sheets

METHOD AND SYSTEM FOR TRAINING OF ARTIFICIAL INTELLIGENCE AND MACHINE LEARNING MODELS

BACKGROUND

1. Field of the Disclosure

This technology relates to methods and systems for training of artificial intelligence (AI) and machine learning (ML) models in order to ensure efficiency and high quality performance.

2. Background Information

A machine learning (ML) model life cycle (MLMLC) is a complex interdisciplinary business process. Conventionally, the MLMLC is often used for developing information technology data-analysis applications in which no closed-form algorithmic solution is known but for which sufficient historical or reference data is available, and in which a solution may be operationalized against related data.

There are many known challenges to MLMLC, including: the use of large and complex data sets having uncertain quality of data; lack of data labels; subjective success criteria for a particular ML application and its underlying ML mode; variability in application data with respect to reference data used for an initial MLMLC; selecting an optimal ML algorithm for a particular situation; and difficulty in finding optimal or near-optimal hyperparameter values for a given ML algorithm for the reference data.

In a model development life cycle (MDLC), data scientists typically use sophisticated statistical and algorithmic techniques, domain knowledge, data analytics, large evolving ML software tool sets, and trial-and-error computational experiments to produce and evaluate ML models. In model operationalization (MLOps), ML and data and application engineers deploy, measure, manage, maintain, and report on ML applications which integrate ML models.

MLMLC is a knowledge intensive process. A data scientist and a data/application engineer typically rely on personal knowledge, team knowledge, and event-drive problem resolution to navigate the MDLC and/or the MLOps. However, this process is subject to error and sub-optimal execution.

Accordingly, there is a need for a mechanism for training of artificial intelligence (AI) and machine learning (ML) models in order to ensure efficiency and high quality performance.

SUMMARY

The present disclosure, through one or more of its various aspects, embodiments, and/or specific features or sub-components, provides, inter alia, various systems, servers, devices, methods, media, programs, and platforms for reliably and securely classifying and verifying personal data in order to avoid fraud and other crimes relating to identity theft.

According to an aspect of the present disclosure, a method for training a machine learning model is provided. The method is implemented by at least one processor. The method includes: receiving, by the at least one processor, a first plurality of parameters that relate to measuring a training status of a first machine learning (ML) model; executing, by the at least one processor, a first training operation with respect to the first ML model in order to generate respective values of each of the first plurality of parameters; analyzing, by the at least one processor, a result of the first training operation based on the respective values of each of the first plurality of parameters; and determining, by the at least one processor based on a result of the analyzing, whether the first training operation has generated an improvement in the first ML model.

The method may further include: when the first training operation is determined as having generated an improvement in the first ML model, executing a second training operation with respect to the first ML model based on the first plurality of parameters.

The method may further include: when the first training operation is determined as not having generated an improvement in the first ML model, receiving a second plurality of parameters that relate to measuring the training status of the first ML model and executing a second training operation with respect to the first ML model in order to generate respective values of each of the second plurality of parameters.

The method may further include: using the respective values of the first plurality of parameters to automatically generate a second plurality of parameters that relate to measuring the training status of the first ML model; and executing a second training operation with respect to the first ML model in order to generate respective values of each of the second plurality of parameters.

The using of the respective values of the first plurality of parameters to automatically generate the second plurality of parameters may include executing a first ML algorithm that is configured to generate parameters that relate to measuring the training status of the first ML model.

The method may further include displaying, via a graphical user interface (GUI), information that illustrates a result of the analyzing.

The displaying may include displaying at least one from among first information that relates to at least one decision tree that indicates a workflow with respect to the first ML model, second information that relates to a historical record of decisions that have been made with respect to the first ML model, and third information that relates to a comparison between a performance of the first ML model and a performance of at least one additional ML model.

The method may further include transmitting, to at least one predetermined destination, a message that indicates a training progress status of the first ML model.

The method may further include: receiving information that relates to a second ML model; using the first plurality of parameters to execute a second training operation with respect to the second ML model in order to generate respective values of each of the first plurality of parameters with respect to the second ML model; analyzing a result of the second training operation based on the respective values of each of the first plurality of parameters with respect to the second ML model; and determining, based on the result of the analyzing of the result of the first training operation and the result of the analyzing of the second training operation, which one from among the first ML model and the second ML model is a better ML model in relation to a predetermined task.

According to another aspect of the present disclosure, a computing apparatus for training a machine learning model data is provided. The computing apparatus includes a processor; a memory; a display; and a communication interface coupled to each of the processor, the memory, and the display. The processor is configured to: receive, via the communication interface, a first plurality of parameters that relate to measuring a training status of a first machine learning (ML) model; execute a first training operation with respect to the first ML model in order to generate respective values of each of the first plurality of parameters; analyze a result of the first training operation based on the respective values of each of the first plurality of parameters; and determine, based on a result of the analysis, whether the first training operation has generated an improvement in the first ML model.

The processor may be further configured to: when the first training operation is determined as having generated an improvement in the first ML model, execute a second training operation with respect to the first ML model based on the first plurality of parameters.

The processor may be further configured to: when the first training operation is determined as not having generated an improvement in the first ML model, receive, via the communication interface, a second plurality of parameters that relate to measuring the training status of the first ML model and execute a second training operation with respect to the first ML model in order to generate respective values of each of the second plurality of parameters.

The processor may be further configured to: use the respective values of the first plurality of parameters to automatically generate a second plurality of parameters that relate to measuring the training status of the first ML model; and execute a second training operation with respect to the first ML model in order to generate respective values of each of the second plurality of parameters.

The processor may be further configured to automatically generate the second plurality of parameters by executing a first ML algorithm that is configured to generate parameters that relate to measuring the training status of the first ML model.

The processor may be further configured to cause the display to display, via a graphical user interface (GUI), information that illustrates a result of the analysis.

The processor may be further configured to cause the display to display at least one from among first information that relates to at least one decision tree that indicates a workflow with respect to the first ML model, second information that relates to a historical record of decisions that have been made with respect to the first ML model, and third information that relates to a comparison between a performance of the first ML model and a performance of at least one additional ML model.

The processor may be further configured to transmit, via the communication interface to at least one predetermined destination, a message that indicates a training progress status of the first ML model.

The processor may be further configured to: receive, via the communication interface, information that relates to a second ML model; use the first plurality of parameters to execute a second training operation with respect to the second ML model in order to generate respective values of each of the first plurality of parameters with respect to the second ML model; analyze a result of the second training operation based on the respective values of each of the first plurality of parameters with respect to the second ML model; and determine, based on the result of the analysis of the result of the first training operation and the result of the analysis of the second training operation, which one from among the first ML model and the second ML model is a better ML model in relation to a predetermined task.

According to yet another aspect of the present disclosure, a non-transitory computer readable storage medium storing instructions for training a machine learning model is provided. The storage medium includes executable code which, when executed by a processor, causes the processor to: receive a first plurality of parameters that relate to measuring a training status of a first machine learning (ML) model; execute a first training operation with respect to the first ML model in order to generate respective values of each of the first plurality of parameters; analyze a result of the first training operation based on the respective values of each of the first plurality of parameters; and determine, based on a result of the analysis, whether the first training operation has generated an improvement in the first ML model.

When executed by the processor, the executable code may further cause the processor to: when the first training operation is determined as not having generated an improvement in the first ML model, receive a second plurality of parameters that relate to measuring the training status of the first ML model and execute a second training operation with respect to the first ML model in order to generate respective values of each of the second plurality of parameters.

According to still another aspect of the present disclosure, a method for interactively monitoring a training status in a machine learning model is provided. The method is implemented by at least one processor. The method includes: receiving, by the at least one processor, a first plurality of parameters that relate to measuring a training status of a first machine learning (ML) model; executing, by the at least one processor, a first training operation with respect to the first ML model in order to generate respective values of each of the first plurality of parameters; receiving, by the at least one processor from a user, a first user input that relates to a first task that is performable by using the first ML model; performing, by the at least one processor, the first task based on the first user input; analyzing, by the at least one processor, a result of the first training operation and a first impact upon the first ML model caused by the first user input; and transmitting, by the at least one processor to the user, a first notification message that includes a result of the analyzing.

The method may further include displaying, via a graphical user interface (GUI), information that corresponds to the first notification message and illustrates the result of the analyzing.

The method may further include: receiving, from the user, a second user input that relates to the result of the analyzing; repeating a performance of the first task based on the second user input; analyzing a second impact upon the first ML model caused by the second user input; and transmitting, to the user, a second notification message that includes a result of the analyzing of the second impact.

The method may further include: executing, by the at least one processor, the first training operation with respect to a second ML model in order to generate respective values of each of the first plurality of parameters; receiving, by the at least one processor from a user, a second user input that relates to a second task that is performable by using the second ML model; analyzing, by the at least one processor, a result of the first training operation and a third impact upon the second ML model caused by the second user input; and transmitting, by the at least one processor to the user, a third notification message that includes a result of the analyzing with respect to the second ML model.

Each of the first ML model and the second ML model may be trained by using a single common set of training data.

The second notification message may include information that relates to a comparison between a performance of the first ML model and a performance of the second ML model.

According to yet another aspect of the present disclosure, a method for monitoring a status of a machine learning model in a machine learning model life cycle is provided. The method is implemented by at least one processor. The method includes: receiving, by the at least one processor, a first plurality of parameters that relate to measuring a life cycle status of a first machine learning (ML) model; executing, by the at least one processor, a first life cycle development operation with respect to the first ML model in order to generate respective values of each of the first plurality of parameters; analyzing, by the at least one processor, a result of the first life cycle development operation based on the respective values of each of the first plurality of parameters; and determining, by the at least one processor based on a result of the analyzing, whether the first life cycle development operation has generated a progression with respect to the ML model life cycle.

The method may further include: when the first life cycle development operation is determined as having generated a progression, executing a second life cycle development operation with respect to the first ML model based on the first plurality of parameters.

The method may further include: when the first life cycle development operation is determined as not having generated a progression, receiving a second plurality of parameters that relate to measuring the life cycle status of the first ML model and executing a second life cycle development operation with respect to the first ML model in order to generate respective values of each of the second plurality of parameters.

The method may further include: using the respective values of the first plurality of parameters to automatically generate a second plurality of parameters that relate to measuring the life cycle status of the first ML model; and executing a second life cycle development operation with respect to the first ML model in order to generate respective values of each of the second plurality of parameters.

The using of the respective values of the first plurality of parameters to automatically generate the second plurality of parameters may include executing a first ML algorithm that is configured to generate parameters that relate to measuring the life cycle status of the first ML model.

The method may further include displaying, via a graphical user interface (GUI), information that illustrates a result of the analyzing.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
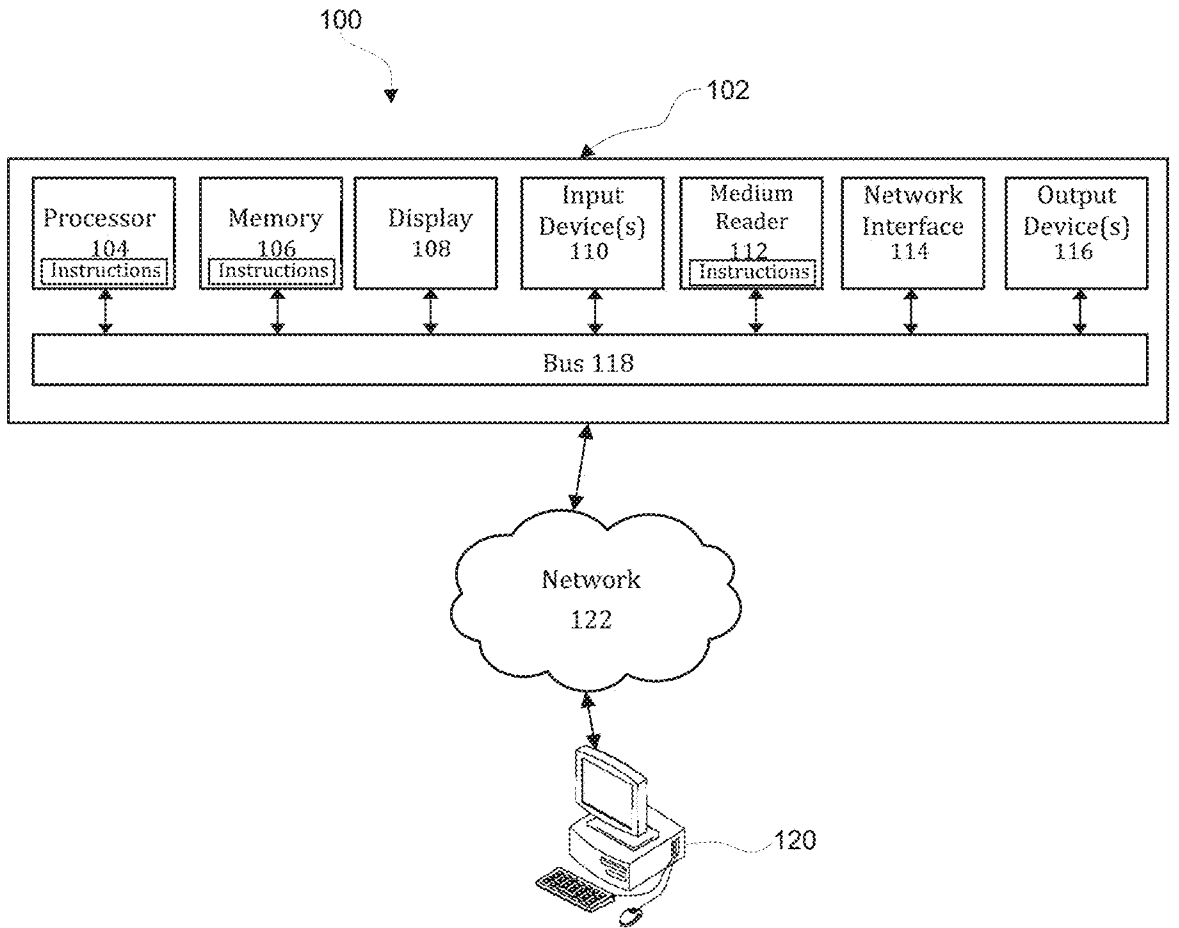
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for training of artificial intelligence (AI) and machine learning (ML) models in order to ensure efficiency and high quality performance.

Figure 2:
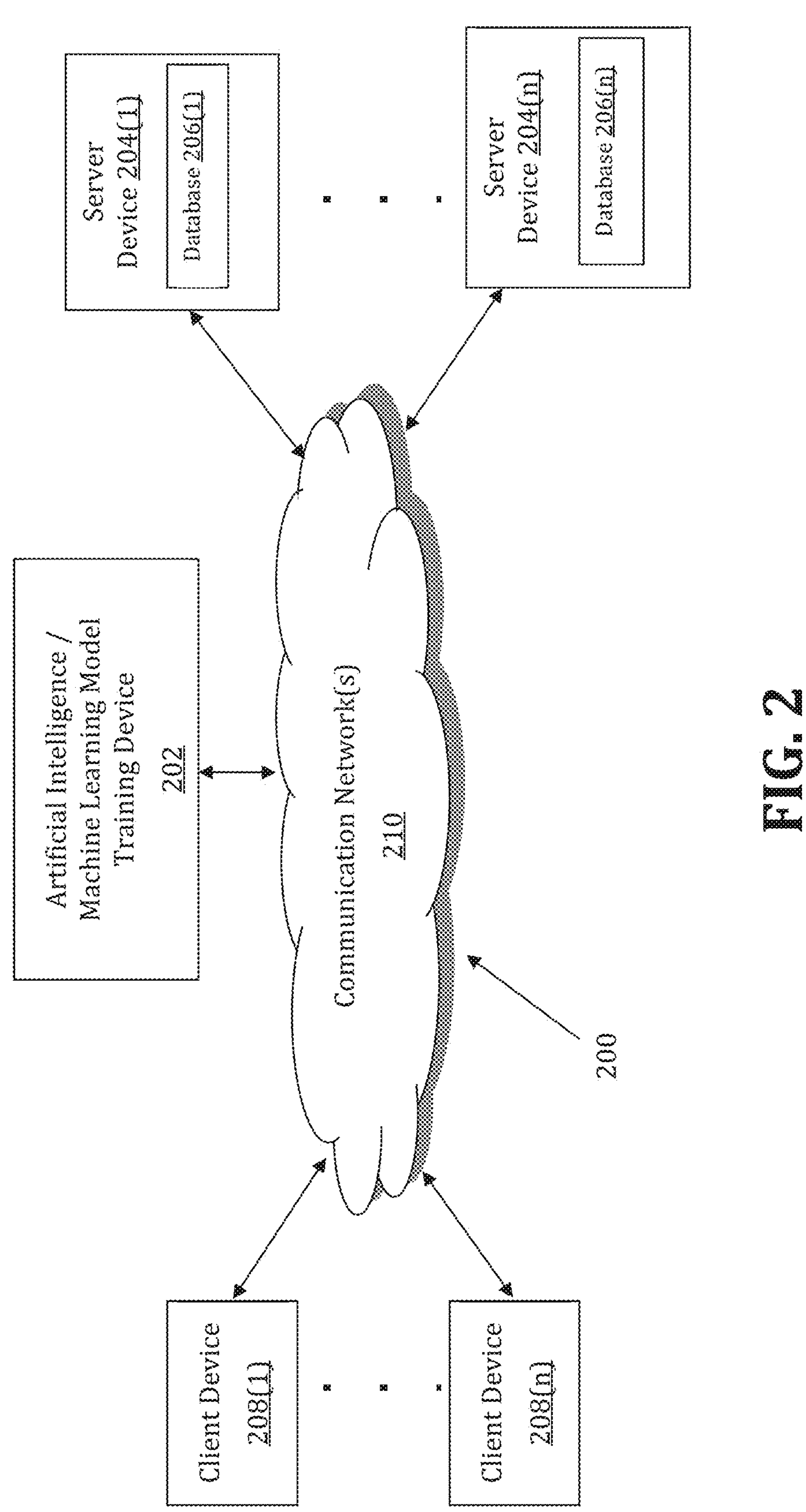
FIG. 2 illustrates an exemplary diagram of a network environment.

Referring to FIG. 2, a schematic of an exemplary network environment 200 for implementing a method for training of AI and ML models in order to ensure efficiency and high quality performance is illustrated. In an exemplary embodiment, the method is executable on any networked computer platform, such as, for example, a personal computer (PC).

The method for training of AI and ML models in order to ensure efficiency and high quality performance may be implemented by an Artificial Intelligence/Machine Learning Model Training (AIMLMT) device 202. The AIMLMT device 202 may be the same or similar to the computer system 102 as described with respect to FIG. 1. The AIMLMT device 202 may store one or more applications that can include executable instructions that, when executed by the AIMLMT device 202, cause the AIMLMT device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AIMLMT device 202 itself, may be located in virtual server(s) running in a cloud-based computing environment rather than being tied to one or more specific physical network computing devices. Also, the application(s) may be running in one or more virtual machines (VMs) executing on the AIMLMT device 202. Additionally, in one or more embodiments of this technology, virtual machine(s) running on the AIMLMT device 202 may be managed or supervised by a hypervisor.

In the network environment 200 of FIG. 2, the AIMLMT device 202 is coupled to a plurality of server devices **204(1)-204(*n*) that hosts a plurality of databases 206(1)-206(*n*), and also to a plurality of client devices 208(1)-208(*n*) via communication network(s) 210. A communication interface of the AIMLMT device 202, such as the network interface 114 of the computer system 102 of FIG. 1, operatively couples and communicates between the AIMLMT device 202, the server devices 204(1)-204(*n*), and/or the client devices 208(1)-208(*n*), which are all coupled together by the communication network(s) 210**, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AIMLMT device 202, the server devices **204(1)-204(*n*), and/or the client devices 208(1)-208(*n*) may be coupled together via other topologies. Additionally, the network environment 200** may include other network devices such as one or more routers and/or switches, for example, which are well known in the art and thus will not be described herein. This technology provides a number of advantages including methods, non-transitory computer readable media, and AIMLMT devices that efficiently implement a method for training of artificial intelligence (AI) and machine learning (ML) models in order to ensure efficiency and high quality performance.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AIMLMT device 202 may be a standalone device or integrated with one or more other devices or apparatuses, such as one or more of the server devices **204(1)-204(*n*), for example. In one particular example, the AIMLMT device 202 may include or be hosted by one of the server devices 204(1)-204(*n*), and other arrangements are also possible. Moreover, one or more of the devices of the AIMLMT device 202** may be in a same or a different communication network including one or more public, private, or cloud networks, for example.

The plurality of server devices **204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the AIMLMT device 202 via the communication network(s) 210** according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store historical performance data that relates to AI/ML models and data that relates to metrics and parameters that are usable for training AI/ML models.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the AIMLMT device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the AIMLMT device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the AIMLMT device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AIMLMT device 202, the server devices 204(1)-204(*n*), or the client devices 208(1)-208(*n*), for example, may be configured to operate as virtual instances on the same physical machine. In other words, one or more of the AIMLMT device 202, the server devices 204(1)-204(*n*), or the client devices 208(1)-208(*n*) may operate on the same physical device rather than as separate devices communicating through communication network(s) 210. Additionally, there may be more or fewer AIMLMT devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
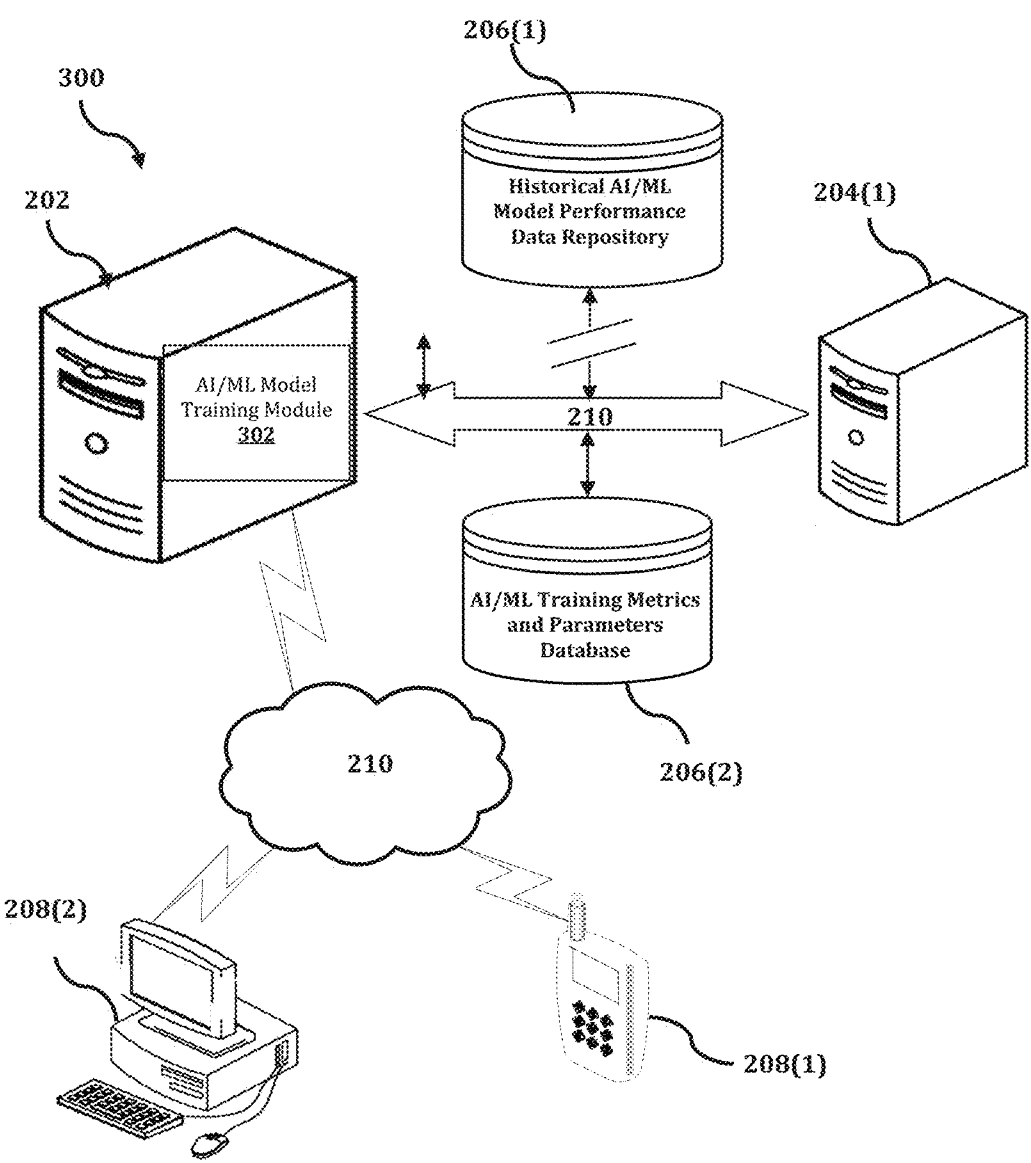
FIG. 3 shows an exemplary system for implementing a method for training of AI and ML models in order to ensure efficiency and high quality performance.

The AIMLMT device 202 is described and illustrated in FIG. 3 as including an AI/ML model training module 302, although it may include other rules, policies, modules, databases, or applications, for example. As will be described below, the AI/ML model training module 302 is configured to implement a method for training of artificial intelligence (AI) and machine learning (ML) models in order to ensure efficiency and high quality performance.

An exemplary process 300 for implementing a mechanism for training of artificial intelligence (AI) and machine learning (ML) models in order to ensure efficiency and high quality performance by utilizing the network environment of FIG. 2 is illustrated as being executed in FIG. 3. Specifically, a first client device 208(1) and a second client device 208(2) are illustrated as being in communication with AIMLMT device 202. In this regard, the first client device 208(1) and the second client device 208(2) may be "clients" of the AIMLMT device 202 and are described herein as such. Nevertheless, it is to be known and understood that the first client device 208(1) and/or the second client device 208(2) need not necessarily be "clients" of the AIMLMT device 202, or any entity described in association therewith herein. Any additional or alternative relationship may exist between either or both of the first client device 208(1) and the second client device 208(2) and the AIMLMT device 202, or no relationship may exist.

Further, AIMLMT device 202 is illustrated as being able to access a historical AI/ML model performance data repository 206(1) and an AI/ML training metrics and parameters database 206(2). The AI/ML model training module 302 may be configured to access these databases for implementing a method for training of artificial intelligence (AI) and machine learning (ML) models in order to ensure efficiency and high quality performance.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AIMLMT device 202 via broadband or cellular communication. Of course, these embodiments are merely exemplary and are not limiting or exhaustive.

Upon being started, the AI/ML model training module 302 executes a process for training of artificial intelligence (AI) and machine learning (ML) models in order to ensure efficiency and high quality performance. An exemplary process for training of artificial intelligence (AI) and machine learning (ML) models in order to ensure efficiency and high quality performance is generally indicated at flowchart 400 in FIG. 4.

Figure 4:
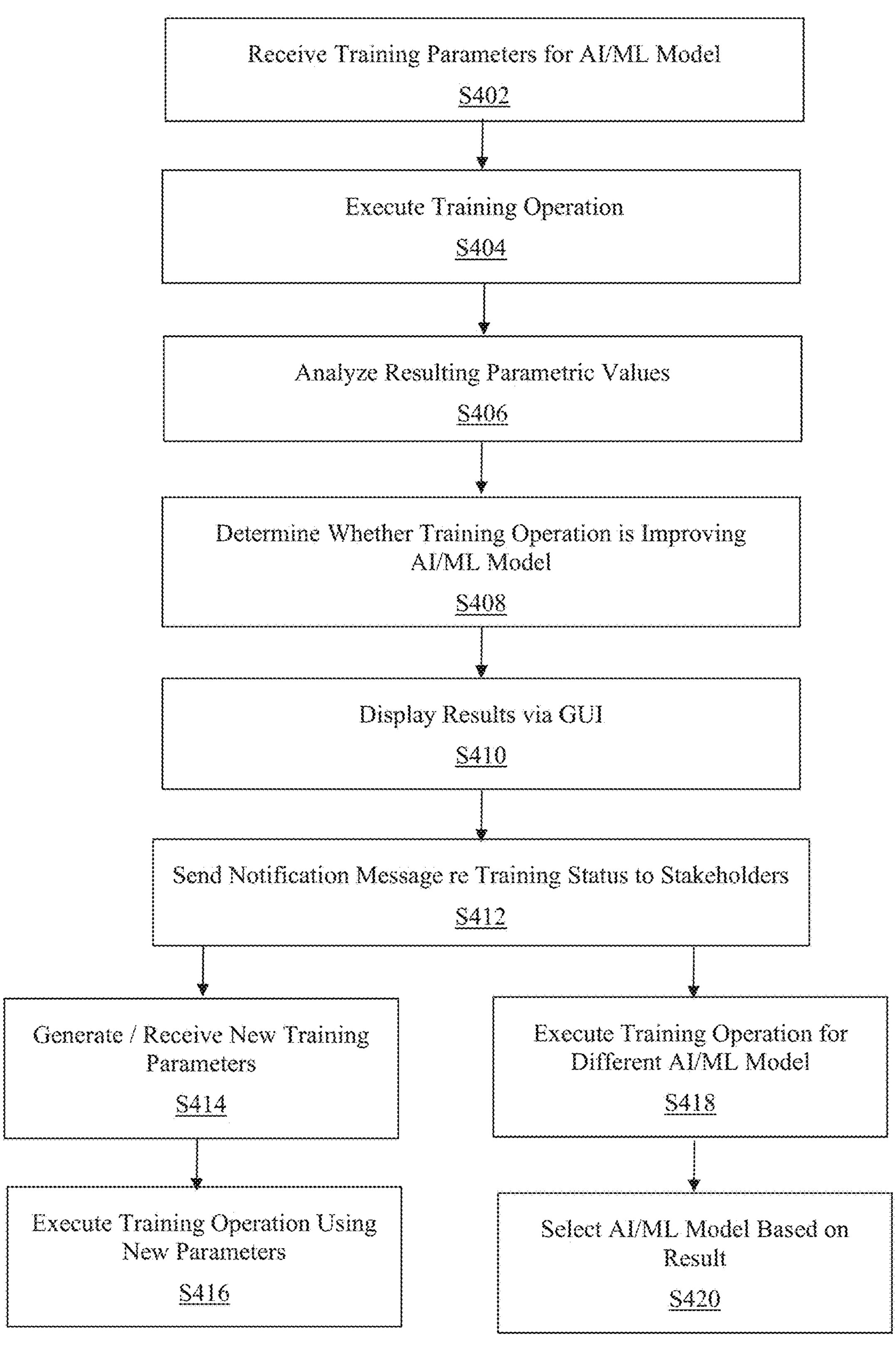
FIG. 4 is a flowchart of an exemplary process for implementing a method for training of AI and ML models in order to ensure efficiency and high quality performance.

In process 400 of FIG. 4, at step S402, the AI/ML model training module 302 receives a first set of parameters that relate to measuring a training status of a first machine learning (ML) model. Then, at step S404, the AI/ML model training module 302 executes a first training operation with respect to the first ML model in order to generate respective values of each parameter included in the first set of parameters.

At step S406, the AI/ML model training module 302 analyzes the parametric values generated as a result of the training operation executed in step S404. Then, at step S408, the AI/ML model training module 302 determines whether the training operation is having the desired effect of improving the first ML model. Based on this determination, the AI/ML model training module may exercise any one of at least three paths, including 1) continuing to train the first ML model based on the first set of parameters; 2) obtaining new parameters, i.e., a second set of parameters, for use in subsequent training operations with respect to the first ML model; and 3) executing a training operation with respect to at least one different ML model using the same first set of parameters.

At step S410, the AI/ML model training module 302 displays results from the training operation via a graphical user interface (GUI), in order to allow a user to visually assess the results and whether the training operation is improving the ML model. Then, at step S412, the AI/ML model training module 302 transmits a message to a predetermined destination, i.e., a stakeholder and/or any other interested party, in order to provide a notification regarding a training status of the ML model.

At step S414, the AI/ML model training module 302 generates and/or receives new parameters, i.e., a second set of parameters, for use in subsequent training operations with respect to the first ML model. In an exemplary embodiment, the second set of parameters may be received from an external source, such as a user input. Alternatively, in another exemplary embodiment, the second set of parameters may be generated automatically by using the parametric values of the first set of parameters as an input into an AI/ML algorithm that is configured to generate training parameters for measuring various aspects of the first ML model. Then, at step S416, the AI/ML model training module executes a new training operation by using the new second set of parameters.

As an alternative, instead of proceeding to step S414 from step S412, the AI/ML model training module 302 may proceed to step S418, in which a new training operation is executed by using the first set of parameters with respect to at least one different ML model. In an exemplary embodiment, several different ML models may be employed with respect to the same first set of parameters, in order to provide baseline results for comparing the various ML models with each other Then, in step S420, the AI/ML model training module 302 selects an AI/ML model for further training and use.

Upon being started, the AI/ML model training module 302 executes a different process for monitoring a training status of artificial intelligence (AI) and machine learning (ML) models in order to provide intelligent assistance to users. An exemplary process for monitoring a training status of artificial intelligence (AI) and machine learning (ML) models in order to provide intelligent assistance to users is generally indicated at flowchart 500 in FIG. 5.

Figure 5:
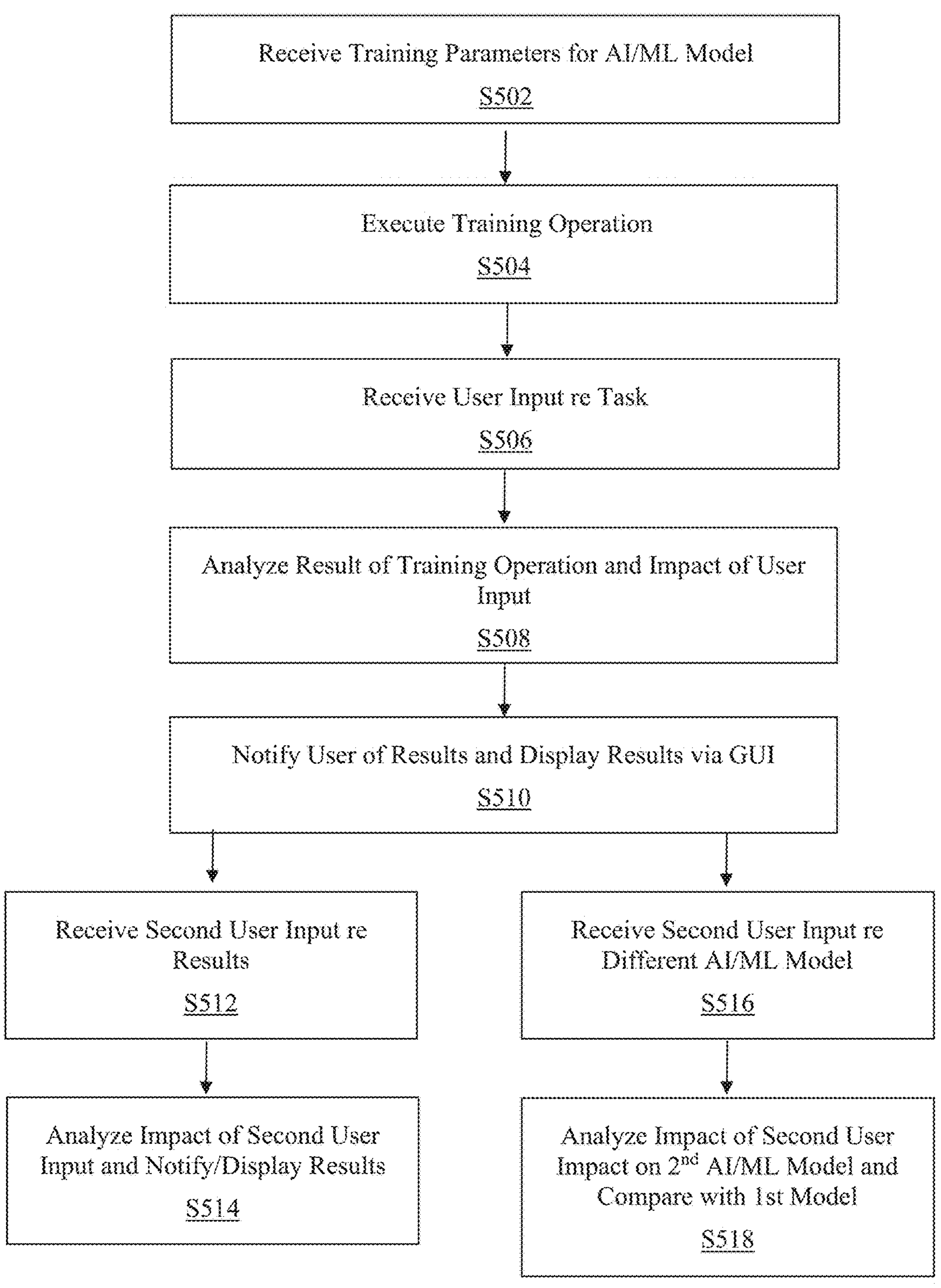
FIG. 5 is a flowchart of an exemplary process for implementing a method for interactively monitoring a training status in AI and ML models.

In process 500 of FIG. 5, at step S502, the AI/ML model training module 302 receives a first set of parameters that relate to measuring a training status of a first machine learning (ML) model. Then, at step S504, the AI/ML model training module 302 executes a first training operation with respect to the first ML model in order to generate respective values of each parameter included in the first set of parameters.

At step S506, the AI/ML model training module 302 receives a first user input that relates to a task that is performable by the first ML model. Then, at step S508, the AI/ML model training module analyzes the parametric values generated as a result of the training operation executed in step S504 and an impact to the first ML model that may be been caused by the user input received in step S506. In this aspect, the AI/ML training module 302 effectively interacts with the user by accepting user inputs and assessing the impact of those user inputs upon the performance and training of the ML model.

At step S510, the AI/ML model training module 302 notifies the user of the results of the analysis performed in step S508 and also displays those same results via a graphical user interface (GUI). Then, the user may decide to provide a second user input, either with respect to further adjusting the first AI/ML, model or with respect to making use of a different AI/ML model to see whether improved results are achievable.

In a first alternative, at step S512, the AI/ML model training module receives a second user input with respect to further adjusting the first AI/ML model, and then, at step S514, the AI/ML model training module analyzes an impact of the second user input upon the first AI/ML model. In this regard, the user and the AI/ML model training module 302 can repeat steps S512 and S514 as many times as desired, in order to effectively provide an interactive monitoring of the first AI/ML model based on a sequence of user inputs and results generated thereby.

In a second alternative, at step S516, the AI/ML model training module receives a second user input with respect to using a different AI/ML model, i.e., a second AI/ML model in order to allow the user to make a determination whether a different model may be more effective for performing certain tasks. Then, at step S518, the AI/ML model training module analyzes an impact of the second user input upon the performance of the second AI/ML model and notifies the user of the results of that analysis. In this regard, the user and the AI/ML model training module 302 can repeat steps S516 and S518 as many times as desired, using as many different AI/ML models as desired, in order to effectively provide an interactive monitoring of any desired number of AI/ML models based on a sequence of user inputs and results generated thereby. In an exemplary embodiment, the first AI/ML model and the other AI/ML models may be trained by using a single common set of training data, and all such models may be suitable for performing the same types of tasks.

Figure 6:
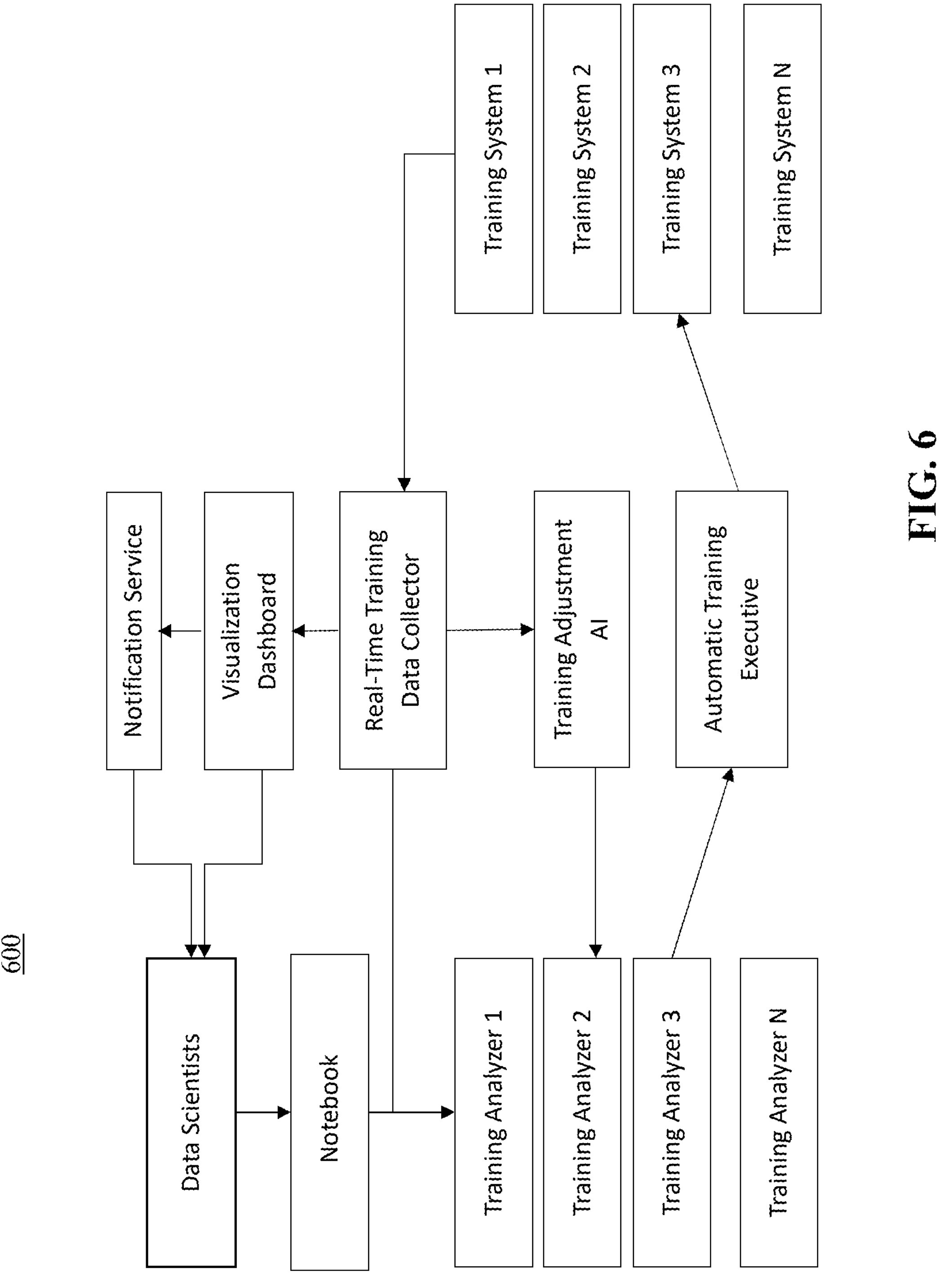
FIG. 6 is a block diagram that illustrates components that are usable in a system that implements a method for training of AI and ML models in order to ensure efficiency and high quality performance, according to an exemplary embodiment.

FIG. 6 is a block diagram 600 that illustrates components that are usable in a system that implements a method for training of AI and ML models in order to ensure efficiency and high quality performance, according to an exemplary embodiment. As shown in block diagram 600, in an exemplary embodiment, the system may use inputs provided by data scientists and conveyed via a notebook component in order to train an ML model. For example, the notebook component may include a Jupyter Notebook, i.e., a web-based tool for interactive coding that incorporates documentation, visualization, and related code in a web page, which is a type of tool that is often used by data scientists for creating, analyzing, and interacting with ML models.

Referring again to block diagram 600, the inputs may be provided to one or more training analyzer components, which in turn generate sets of parameters to be used for measuring various aspects that indicate a training status of an ML model. The parameters may then be fed into an automatic training executive component, which executes a training operation based on the parameters with respect to at least one training system, i.e., an ML model. In an exemplary embodiment, the training operation may be performed in sequence or in parallel with respect to any number of ML training models to be evaluated.

After each training operation has been completed, the respective ML model/training system transmits results thereof to a real-time training data collector component. In an exemplary embodiment, the results include parametric values that are generated by the execution of the training operation. These results are then provided to a visualization dashboard component in order to facilitate one or more displays of the results via a graphical user interface, potentially including a variety of display formats. The results may also be provided to a notification service component so that a message providing a notification of the status of the ML model may be generated and transmitted to stakeholders and/or interested parties.

Referring again to FIG. 6, in an exemplary embodiment, the real-time training data collector component also provides the results of the training operation to a training adjustment AI component, which in turn forwards these results back to one or more of the training analyzer components in order to facilitate a generation of a new set of parameters for subsequent training operations. In an exemplary embodiment, the training adjustment AI component may apply an AI algorithm that is designed to generate various parameter types for training ML models based on the inputted results. Then, after the new parameter set has been generated, then the automatic training executive component receives the new parameter set and uses the new parameters for subsequent training operations with respect to one or more of the ML models.

Figure 7:
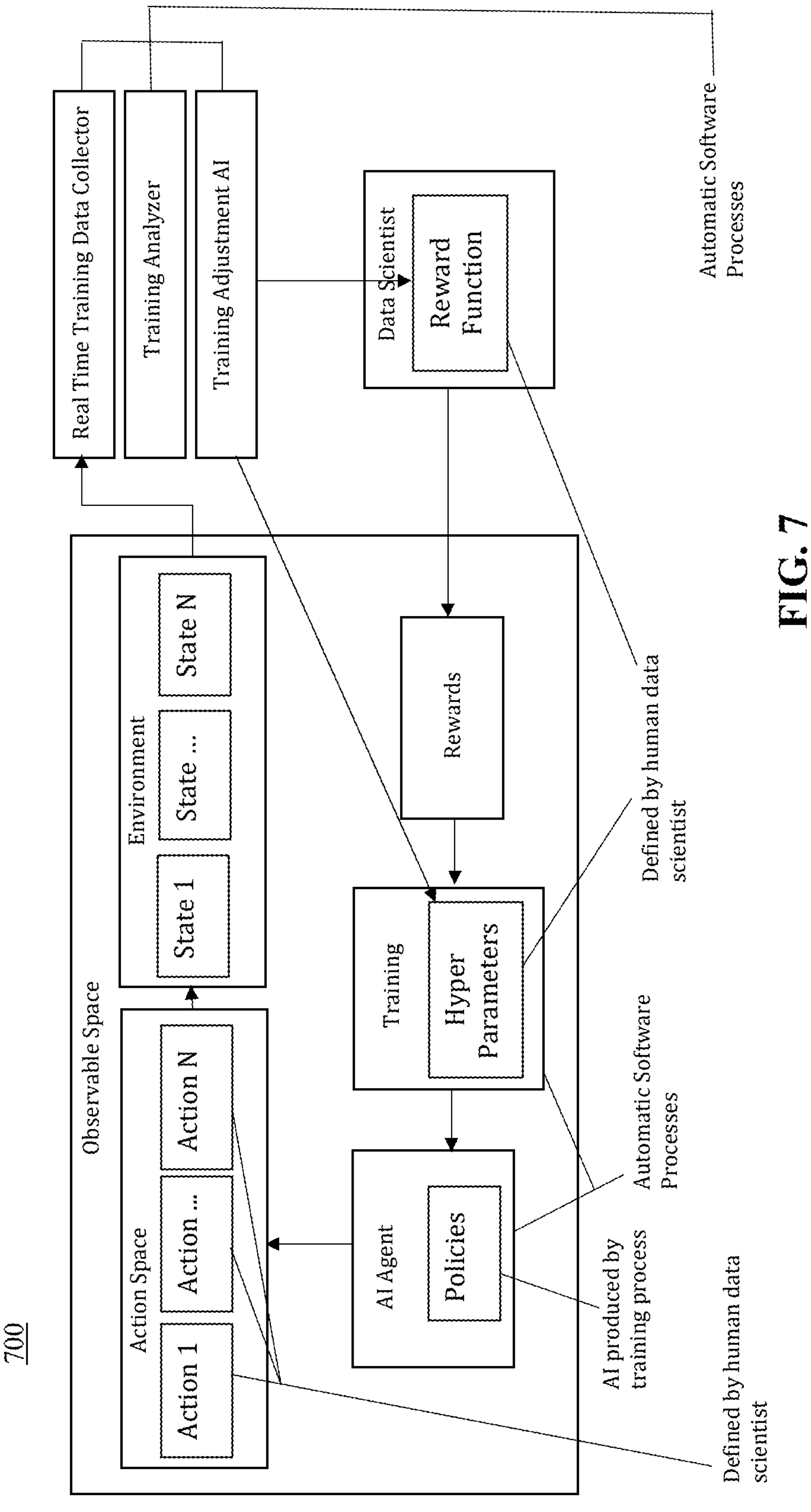
FIG. 7 is a flow diagram that illustrates a set of data flows generated by using a system that implements a method for training of AI and ML models in order to ensure efficiency and high quality performance, according to an exemplary embodiment.

FIG. 7 is a flow diagram 700 that illustrates a set of data flows generated by using a system that implements reinforcement learning into a method for training of AI and ML models in order to ensure efficiency and high quality performance, according to an exemplary embodiment. As illustrated in diagram 700, with respect to a reinforcement learning problem, there is an environment with a number of states and some notion of a desired outcome, and a human data scientist defines an action space, a set of hyperparameters, and a reward function. The action space is a set of possible action that results in state transitions within the environment. The reward function generates a reward for each action-state pair based on its proximity to the desired outcome. The hyperparameters are parameters of the machine learning process that use rewards as feedback to generate policies for selecting actions in order to produce the desired outcome.

Referring again to FIG. 7, in an exemplary embodiment, observations into the environment, the policies, and the rewards (i.e., the observable space) are needed in order to provide insights into the various performance dimensions of the reward function and the training process. Such insights are usable for enhancing reinforcement learning, which occurs by the following: The real time training data collector component receives data from the observable space for analysis and visualization by the training analyzer component. The training analyzer component works in conjunction with the training adjustment AI component to improve and optimize the hyperparameters and the reward functions. In an exemplary embodiment, these reinforcement learning function are performed automatically in software. Alternatively, the reinforcement learning functions may be performed manually by data scientists.

Figure 8:
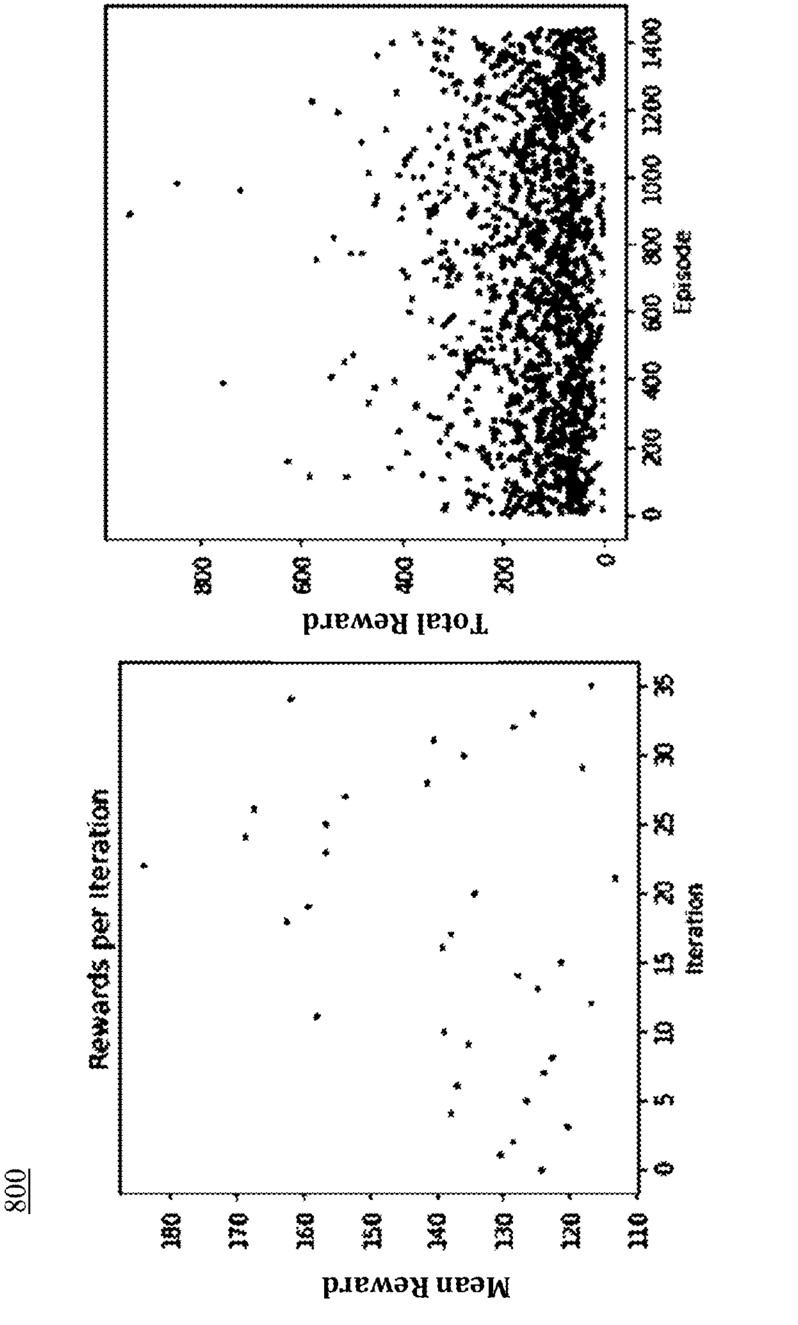
FIG. 8 is a first set of graphs that illustrate results of executing a method for training of AI and ML models in order to ensure efficiency and high quality performance, according to an exemplary embodiment.

FIG. 8 is a first set of graphs 800 that illustrate results of executing a method for training of AI and ML models in order to ensure efficiency and high quality performance, according to an exemplary embodiment. As illustrated in FIG. 8, a particular training run may be analyzed by measuring a sum of all rewards of an optimal sequence of actions at all states. On the left side of FIG. 8, a first graph shows a mean reward as a function of an iteration of a training operation, and on the right side of FIG. 8, a second graph shows a total reward value as a function of a training episode. In an exemplary embodiment, this notion of a "best current total reward" value may provide an explanation of training progress. An analysis of trends in reward metrics may be performed by a reward analyzer in order to show a status of training progress.

Figure 9:
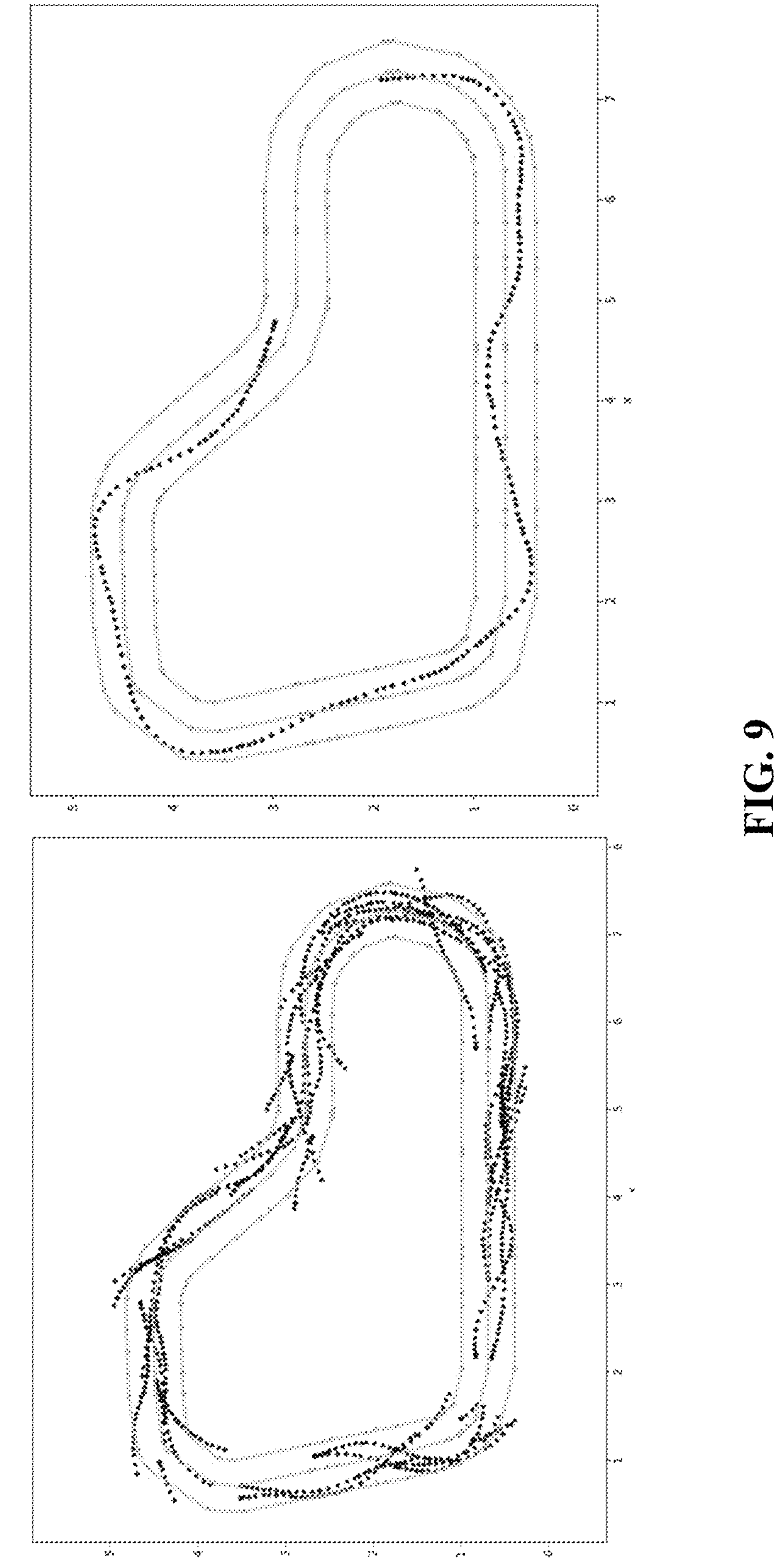
FIG. 9 is a second set of graphs that illustrate results of executing a method for training of AI and ML models in order to ensure efficiency and high quality performance, according to an exemplary embodiment.

FIG. 9 is a second set of graphs 900 that illustrate results of executing a method for training of AI and ML models in order to ensure efficiency and high quality performance, according to an exemplary embodiment. As illustrated in FIG. 9, a metric that can be calculated for one particular ML model may be understood in terms of a car staying on a track. In this aspect, an average amount of progress without going off track may be understood as a part of a state of the training environment for this ML model. In particular, one specific metric for explaining training progress is the number of consecutive states that the car stays on track during model evaluation, i.e., the larger this number, the better the car has learned to navigate the track. A policy analyzer component may analyze actions taken at different points around the track, which are results of policies generated by training the ML model.

The evaluation of the training of the ML model may be understood in terms of a calculation of an amount of time that it takes for the car to complete a circuit of the track. In an exemplary embodiment, each time that the car goes off track, a time penalty, e.g., a 3-second penalty, may be added to the time. Therefore, a car that stays on track and chooses actions with the highest average speed will complete the track in a shorter time than cars that either go off track more often and/or choose action s that have lower speeds. As illustrated on the left side of FIG. 9, a first graph shows progress during a training run, as indicated by the positions of the dots with respect to the boundaries of the track, most of which are inside the track boundaries and some of which are outside of the track boundaries; and as shown on the right side of FIG. 9, a second graph shows good training run progress, as all of the dots are inside of the track boundaries.

Accordingly, with this technology, an optimized process for training of artificial intelligence (AI) and machine learning (ML) models in order to ensure efficiency and high quality performance is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for training a machine learning model, the method being implemented by at least one processor, the method comprising:

receiving, by the at least one processor, machine learning (ML) model training data, wherein the ML model training data includes an action-state pair, wherein the action-state pair relates to an action that results in a state transition;

automatically generating, by the at least one processor via a training analyzer and based on the ML model training data, a first plurality of parameters that relate to measuring a training status of a first ML model;

executing, by the at least one processor via an automatic training executive, a first training operation with respect to the first ML model in order to generate first respective values of each of the first plurality of parameters;

analyzing, by the at least one processor via the training analyzer, a result of the first training operation based on the first respective values of each of the first plurality of parameters;

generating, by the at least one processor via a training adjustment artificial intelligence (AI) model and based on results of the first training operation, a plurality of training parameter sets for subsequent training operations, wherein the training analyzer and the training adjustment AI model adjust a hyperparameter and a reward function associated with the first training operation for implementing reinforced learning in the first training operation, wherein the reward function generates a reward for the action-state pair based on a proximity of the action-state pair to a predetermined outcome, wherein the hyperparameters use the reward as feedback to generate policies for selecting actions to produce the predetermined outcome, and wherein the implementing of the reinforced learning includes iteratively performing a series of training operations;

determining, by the at least one processor based on a result of the analyzing, whether the first training operation has generated an improvement in the first ML model;

executing, by the at least one processor via the automatic training executive, a second training operation with respect to a second ML model in order to generate second respective values for each of the first plurality of parameters;

calculating, by the at least one processor, a first performance metric for the first ML model in relation to a performing of a predetermined task using the first ML model;

calculating, by the at least one processor, a second performance metric for the second ML model in relation to a performing of the predetermined task using the second ML model;

comparing, by the at least one processor, the first performance metric with the second performance metric; and selecting, by the at least one processor, one from among the first ML model and the second ML model, based on a result of the comparing.

2. The method of claim 1, further comprising:

when the first training operation is determined as having generated an improvement in the first ML model, executing a third training operation with respect to the first ML model based on the first plurality of parameters.

3. The method of claim 1, further comprising:

when the first training operation is determined as not having generated an improvement in the first ML model, receiving a second plurality of parameters that relate to measuring the training status of the first ML model and executing a third training operation with respect to the first ML model in order to generate third respective values of each of the second plurality of parameters.

4. The method of claim 1, further comprising:

using the first respective values of the first plurality of parameters to automatically generate a second plurality of parameters that relate to measuring the training status of the first ML model; and executing a third training operation with respect to the first ML model in order to generate third respective values of each of the second plurality of parameters.

5. The method of claim 4, wherein the using of the first respective values of the first plurality of parameters to automatically generate the second plurality of parameters comprises executing a first ML algorithm that is configured to generate parameters that relate to measuring the training status of the first ML model.

6. The method of claim 1, further comprising displaying, via a graphical user interface (GUI), information that illustrates a result of the analyzing.

7. The method of claim 6, wherein the displaying comprises displaying at least one from among first information that relates to at least one decision tree that indicates a workflow with respect to the first ML model, second information that relates to a historical record of decisions that have been made with respect to the first ML model, and third information that relates to a comparison between a performance of the first ML model and a performance of at least one additional ML model.

8. A method for interactively monitoring a training status in a machine learning model, the method being implemented by at least one processor, the method comprising:

receiving, by the at least one processor, machine learning (ML) model training data, wherein the ML model training data includes an action-state pair, wherein the action-state pair relates to an action that results in a state transition;

automatically generating, by the at least one processor via a training analyzer and based on the ML model training data, a first plurality of parameters that relate to measuring a training status of a first ML model;

executing, by the at least one processor via an automatic training executive, a first training operation with respect to the first ML model in order to generate first respective values of each of the first plurality of parameters;

receiving, by the at least one processor from a user, a first user input that relates to a first task that is performable by using the first ML model;

performing, by the at least one processor, the first task based on the first user input;

analyzing, by the at least one processor via the training analyzer, a result of the first training operation and a first impact upon the first ML model caused by the first user input;

generating, by the at least one processor via a training adjustment artificial intelligence (AI) model and based on results of the first training operation, a plurality of training parameter sets for subsequent training operations, wherein the training analyzer and the training adjustment AI model adjust a hyperparameter and a reward function associated with the first training operation for implementing reinforced learning in the first training operation, wherein the reward function generates a reward for the action-state pair based on a proximity of the action-state pair to a predetermined outcome, wherein the hyperparameters use the reward as feedback to generate policies for selecting actions to produce the predetermined outcome, and wherein the implementing of the reinforced learning includes iteratively performing a series of training operations;

executing, by the at least one processor via the automatic training executive, a second training operation with respect to a second ML model in order to generate second respective values for each of the first plurality of parameters;

calculating, by the at least one processor, a first performance metric for the first ML model in relation to a performing of a predetermined task using the first ML model;

calculating, by the at least one processor, a second performance metric for the second ML model in relation to a performing of the predetermined task using the second ML model;

comparing, by the at least one processor, the first performance metric with the second performance metric;

selecting, by the at least one processor, one from among the first ML model and the second ML model, based on a result of the comparing; and transmitting, by the at least one processor to the user, a first notification message that includes a result of the selection.

9. The method of claim 8, further comprising displaying, via a graphical user interface (GUI), information that corresponds to the first notification message and illustrates the result of the analyzing.

10. The method of claim 9, further comprising:

receiving, from the user, a second user input that relates to the result of the analyzing;

repeating a performance of the first task based on the second user input;

analyzing a second impact upon the first ML model caused by the second user input; and transmitting, to the user, a second notification message that includes a result of the analyzing of the second impact.

11. The method of claim 10, wherein each of the first ML model and the second ML model is trained by using a single common set of training data.

12. The method of claim 11, wherein the second notification message includes information that relates to the result of the comparing of the first performance metric with the second performance metric.

13. A method for monitoring a status of a machine learning model in a machine learning model life cycle, the method being implemented by at least one processor, the method comprising:

receiving, by the at least one processor, machine learning (ML) model training data, wherein the ML model training data includes an action-state pair, wherein the action-state pair relates to an action that results in a state transition;

automatically generating, by the at least one processor via a training analyzer and based on the ML model training data, a first plurality of parameters that relate to measuring a life cycle status of a first ML model;

executing, by the at least one processor via an automatic training executive, a first life cycle development operation with respect to the first ML model in order to generate first respective values of each of the first plurality of parameters;

analyzing, by the at least one processor via the training analyzer, a result of the first life cycle development operation based on the first respective values of each of the first plurality of parameters;

generating, by the at least one processor via a training adjustment artificial intelligence (AI) model and based on results of the first life cycle development operation, a plurality of training parameter sets for subsequent training operations, wherein the training analyzer and the training adjustment AI model adjust a hyperparameter and a reward function associated with the first life cycle development operation for implementing reinforced learning in the first life cycle development operation, wherein the reward function generates a reward for the action-state pair based on a proximity of the action-state pair to a predetermined outcome, wherein the hyperparameters use the reward as feedback to generate policies for selecting actions to produce the predetermined outcome, and wherein the implementing of the reinforced learning includes iteratively performing a series of training operations;

determining, by the at least one processor based on a result of the analyzing, whether the first life cycle development operation has generated a progression with respect to the ML model life cycle;

executing, by the at least one processor via the automatic training executive, a second life cycle development operation with respect to a second ML model in order to generate second respective values for each of the first plurality of parameters;

calculating, by the at least one processor, a first performance metric for the first ML model in relation to a performing of a predetermined task using the first ML model;

calculating, by the at least one processor, a second performance metric for the second ML model in relation to a performing of the predetermined task using the second ML model;

comparing, by the at least one processor, the first performance metric with the second performance metric; and selecting, by the at least one processor, one from among the first ML model and the second ML model, based on a result of the comparing.

14. The method of claim 13, further comprising:

when the first life cycle development operation is determined as having generated a progression, executing a third life cycle development operation with respect to the first ML model based on the first plurality of parameters.

15. The method of claim 13, further comprising:

when the first life cycle development operation is determined as not having generated a progression, receiving a second plurality of parameters that relate to measuring the life cycle status of the first ML model and executing a third life cycle development operation with respect to the first ML model in order to generate third respective values of each of the second plurality of parameters.

16. The method of claim 13, further comprising:

using the first respective values of the first plurality of parameters to automatically generate a second plurality of parameters that relate to measuring the life cycle status of the first ML model; and executing a third life cycle development operation with respect to the first ML model in order to generate third respective values of each of the second plurality of parameters.

17. The method of claim 16, wherein the using of the first respective values of the first plurality of parameters to automatically generate the second plurality of parameters comprises executing a first ML algorithm that is configured to generate parameters that relate to measuring the life cycle status of the first ML model.

18. The method of claim 13, further comprising displaying, via a graphical user interface (GUI), information that illustrates a result of the analyzing.

* * * * *